(12) United States Patent
Li

(10) Patent No.: US 12,679,952 B2
(45) Date of Patent: Jul. 14, 2026

(54) FIBER-MATRIX COMPOSITES WITH NEGATIVE POISSON'S RATIO

(71) Applicant: Northeastern University, Boston, MA (US)

(72) Inventor: Yaning Li, Durham, NH (US)

(73) Assignee: Northeastern University, Boston, MA (US)

( * ) Notice: Subject to any disclaimer, the term of this patent is extended or adjusted under 35 U.S.C. 154(b) by 80 days.

(21) Appl. No.: 18/588,558

(22) Filed: Feb. 27, 2024

(65) Prior Publication Data

US 2024/0317973 A1     Sep. 26, 2024

Related U.S. Application Data

(60) Provisional application No. 63/448,437, filed on Feb. 27, 2023.

(51) Int. Cl.
B33Y 80/00     (2015.01)
B33Y 70/00     (2020.01)
C08K 7/02     (2006.01)

(52) U.S. Cl.
CPC ................ C08K 7/02 (2013.01); B33Y 70/00 (2014.12); B33Y 80/00 (2014.12)

(58) Field of Classification Search
None
See application file for complete search history.

(56) References Cited

U.S. PATENT DOCUMENTS

2011/0281481 A1* 11/2011 Alderson ................... C08J 5/04
428/221
2020/0047458 A1* 2/2020 Li ........................ B29D 24/005

OTHER PUBLICATIONS

M. Siddorn et al.: "A systematic typology for negative Poisson's ratio materials and the prediction of complete auxeticity in pure silica zeolite JST", Phys. Chem. Chem. Phys., 2015, 17, p. 17927-17933 (Year: 2015).*
Ai et al., "Probabilistic modeling of fatigue life distribution and size effect of components with random defects." International Journal of Fatigue 126 (2019): 165-173.
Bang et al., "A short and long crack growth model based on 2-parameter driving force and crack growth thresholds." International Journal of Fatigue 141 (2020): 105870.
Brown et al., "Retardation and repair of fatigue cracks in a micro-capsule toughened epoxy composite—Part I: Manual infiltration." Composites Science and Technology 65.15-16 (2005): 2466-2473.
Li et al., "Prediction of the anisotropy of chiral mechanical metamaterials via micropolar modeling." Journal of Applied Mechanics 89.10 (2022): 101006.
Liu et al., "Predicting the mixed-mode I/II spatial damage propagation along 3D-printed soft interfacial layer via a hyperelastic softening model." Journal of the Mechanics and Physics of Solids 116 (2018): 17-32.
Mikheevskiy et al., "Analysis of fatigue crack growth under spectrum loading—The UniGrow fatigue crack growth model." Theoretical and Applied Fracture Mechanics 79 (2015): 25-33.

(Continued)

*Primary Examiner* — Mohammad M Ameen

(74) *Attorney, Agent, or Firm* — Foley Hoag LLP; Dana M. Gordon; Laura A. Wzorek

(57)     ABSTRACT

Described is a new family of fiber-reinforced composites/mechanical metamaterials with negative Poisson's ratio.

25 Claims, 8 Drawing Sheets

(56)                  References Cited

OTHER PUBLICATIONS

Siddorn et al., "A systematic typology for negative Poisson's ratio materials and the prediction of complete auxeticity in pure silica zeolite JST." Phys. Chem. Chem. Phys., 2015, 00, 1-3.

Ting et al., "Negative Poisson's ratios in anisotropic linear elastic media." J. Appl. Mech. (2005):929-931.

Xu et al. "Auxetic Two-Phase Chevron Mechanical Metamaterial." Adv. Eng. Mater. 2024, 2400691.

Zhang et al., "Impact properties of uniaxially thermoformed auxetic foams." International Journal of Impact Engineering 163 (2022): 104176.

* cited by examiner shear-induced shrinkage shear-induced dilation $\alpha = 60, \ \beta = 30°$ $\alpha = 45°, \ \beta = 60°$

FIBER-MATRIX COMPOSITES WITH NEGATIVE POISSON'S RATIO

RELATED APPLICATION

This application claims the benefit of priority to U.S. Provisional Patent Application No. 63/448,437, filed Feb. 27, 2023.

BACKGROUND

Auxetics are structures or materials that have a negative Poisson's ratio (NPR). The advantages of materials having an NPR are widely understood. Such materials expand laterally in tension and contract laterally in compression, significantly affecting many other properties. Many researchers report that NPR would enhance the mechanical properties of a material, including its indentation resistance, fracture toughness, volumetric strain energy dissipation, and shear modulus. Materials having a NPR can use used in numerous potential applications.

There are generally two categories of auxetic materials. The auxetic materials in the first category are often relatively soft, experience large deformation and dramatic volume change upon external loads, and are usually used to absorb energy. The auxetic materials in the second category are often relatively stiff and experience small deformation and only a little volume change upon application of external loads, and these materials are usually used for protection and damage toleration. The auxetic materials in the first category have been extensively explored; however, in the field, minimal efforts have been made to investigate the auxetic materials in the second category. There is a need to develop auxetic materials in the second category.

SUMMARY OF THE INVENTION

In certain aspects, provided herein are composite materials, comprising:
  a stratified material,
  wherein the stratified material comprises:
  (i) a first hard phase and a second hard phase, optionally wherein the first hard phase and the second hard phase are not parallel;
  wherein each of the first hard phase and the second hard phase comprises a fiber material with an effective stiffness ($E_f$); and
  (ii) a soft phase, wherein the soft phase comprises a matrix material with an effective stiffness ($E_m$)
  wherein the ratio of $E_f$ to $E_m$ ($E_f/E_m$) is a stiffness ratio greater than about 10;
  in a representative volume element of the composite material, the angle of the first hard phase with respect to a central y-axis of the representative volume element is represented by $\alpha$;
  the angle of first hard phase with respect to the second hard phase is represented by $\beta$;
  $\alpha$ is about 0° to about 75°; and
  $\beta$ is about 0° to about 65° or about 110° to about 180°.

DETAILED DESCRIPTION OF THE INVENTION

Figure 1A:
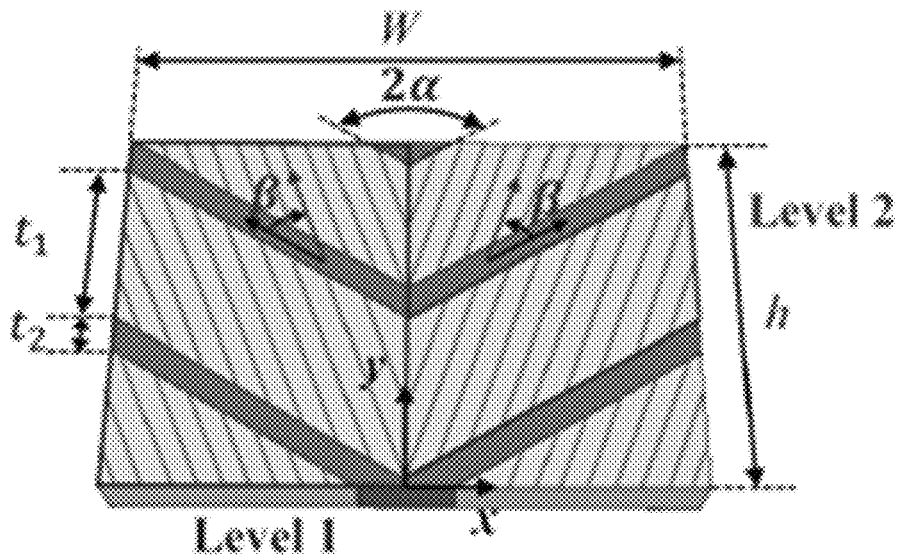
FIG. 1A shows the geometry of a representative volume element (RVE).
Figure 1B:
FIG. 1B shows a schematic illustrating shear-induced shrinkage and shear-induced dilation.
Figure 1B:
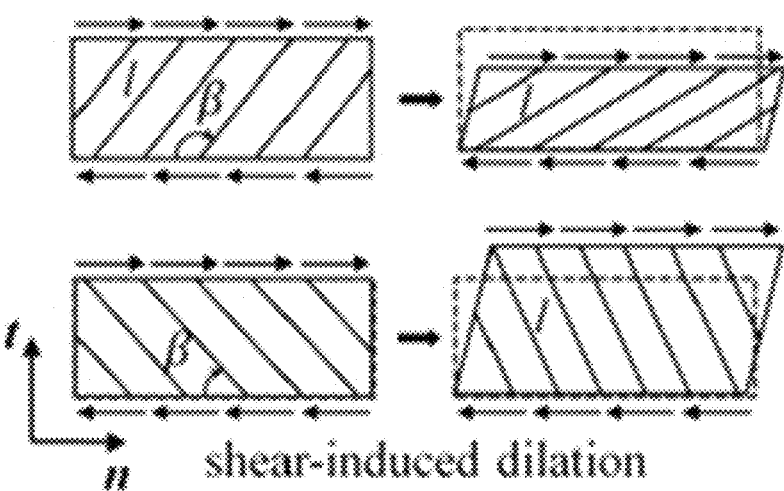

The present invention is based on the surprising discovery of auxetic fiber-reinforced composite materials. These materials were found to have no pores or voids having a volume fraction greater than 10%. In certain embodiments, the auxetic fiber-reinforced composition materials can be rationally designed by selecting particular fiber materials and matrix materials that provide a particular stiffness ratio, and by selecting the particular $\alpha$, $\beta$ angles at which the hard phase and soft phase are configured. Such selections are discussed herein.

In certain aspects, the present invention provides composite materials, comprising:
  a stratified material,
  wherein the stratified material comprises:
  (i) a first hard phase and a second hard phase, optionally wherein the first hard phase and the second hard phase are not parallel;
  wherein each of the first hard phase and the second hard phase comprises a fiber material with an effective stiffness ($E_f$); and
  (ii) a soft phase, wherein the soft phase comprises a matrix material with an effective stiffness ($E_m$);
  wherein the ratio of $E_f$ to $E_m$ ($E_f/E_m$) is a stiffness ratio greater than about 10;
  in a representative volume element of the composite material, the angle of the first hard phase with respect to a central y-axis of the representative volume element is represented by $\alpha$;
  the angle of first hard phase with respect to the second hard phase is represented by $\beta$;
  $\alpha$ is about 0° to about 75°; and
  $\beta$ is about 0° to about 65° or about 110° to about 180°.

In further embodiments, the stratified material is two-phased. In yet further embodiments, the two-phased material comprises two or more hard phases. In still further embodiments, the two-phased material comprises one or more soft phases.

In certain embodiments, the first hard phase and the second hard phase are not parallel.

In certain embodiments, the composite material exhibits auxetic behavior.

In certain embodiments, the volume fraction of the composite material is less than about 10%; or less than about 5%. In further embodiments, the volume fraction of the composite material is less than about 9%. In yet further embodiments, the volume fraction of the composite material is less than about 8%. In still further embodiments, the volume fraction of the composite material is less than about 7%. In certain embodiments, the volume fraction of the composite material is less than about 6%. In further embodiments, the volume fraction of the composite material is less than about 5%. In yet further embodiments, the volume fraction of the composite material is less than about 4%. In still further embodiments, the volume fraction of the composite material is less than about 3%. In certain embodiments, the volume fraction of the composite material is less than about 2%. In further embodiments, the volume fraction of the composite material is less than about 1%. In yet further embodiments, the composite material has no pores or voids.

In certain embodiments, the composite materials can function as major protective components of a structure or devices. In further embodiments, the composite materials can retard cracks and increase damage tolerance. In yet further embodiments, the composite materials may form synclastic curvature naturally. In still further embodiments, the composite materials may better resist indentation loads and impact loads.

In certain embodiments, the composite material exhibits in-plane auxeticity. In further embodiments, the composite materials exhibit out-of-plane auxeticity. In yet further embodiments, the composite materials resist in-plane or out-of-plane loads, such as tension, compression, shear, indentation, and impact loads.

In certain embodiments, the fiber material is selected from carbon fibers, glassy fibers, aramid fibers, such as Kevlar®, natural fibers such as bamboo, hemp, and flax, basalt fibers, polymer fibers, and metallic fibers. In further embodiments, the fiber material is selected from carbon fiber, glass fibers, polymer fiber, aramid fiber, natural fibers, and metallic fibers. In yet further embodiments, the fiber materials are glass fibers.

In certain embodiments, the matrix material is selected from polymer matrix, such as epoxy, polyester, vinylester, and polyimide, metal matrix such as aluminum, magnesium, and titanium, ceramic matrix such as silicon carbide and alumina, carbon matrix, and hybrid matrix such as hybrid polymer/ceramic matrix. In further embodiments, the matrix material is selected from polymer matrix and hybrid matrix.

In certain embodiments, the composite material is patterned. In further embodiments, the composite material comprises a chevron pattern.

In certain embodiments, the stiffness ratio is about 10 to about 100. In further embodiments, the stiffness ratio is about 10. In yet further embodiments, the stiffness ratio is about 20. In still further embodiments, the stiffness ratio is about 30. In certain embodiments, the stiffness ratio is about 40. In further embodiments, the stiffness ratio is about 50. In yet further embodiments, the stiffness ratio is about 60. In still further embodiments, the stiffness ratio is about 70. In certain embodiments, the stiffness ratio is about 80. In further embodiments, the stiffness ratio is about 90. In yet further embodiments, the stiffness ratio is about 100.

In certain embodiments, the stiffness ratio is about 100 to about 1000. In further embodiments, the stiffness ratio is about 200. In yet further embodiments, the stiffness ratio is about 300. In still further embodiments, the stiffness ratio is about 400. In certain embodiments, the stiffness ratio is about 500. In further embodiments, the stiffness ratio is about 600. In yet further embodiments, the stiffness ratio is about 700. In still further embodiments, the stiffness ratio is about 800. In certain embodiments, the stiffness ratio is about 900. In further embodiments, the stiffness ratio is about 1000.

In certain embodiments, the stiffness ratio is about 1000 to about 10000. In further embodiments, the stiffness ratio is about 2000. In yet further embodiments, the stiffness ratio is about 3000. In still further embodiments, the stiffness ratio is about 4000. In certain embodiments, the stiffness ratio is about 5000. In further embodiments, the stiffness ratio is about 6000. In yet further embodiments, the stiffness ratio is about 7000. In still further embodiments, the stiffness ratio is about 8000. In certain embodiments, the stiffness ratio is about 9000. In further embodiments, the stiffness ratio is about 10000. In yet further embodiments, the stiffness ratio is greater than about 10000.

In certain embodiments, the composite material exhibits bi-auxeticity. In further embodiments, the composite materials exhibit auxeticity in both x- and y-directions. In yet further embodiments, the composite materials exhibit auxeticity in the x-direction. In still further embodiments, the composite materials exhibit auxeticity in the y-direction.

In certain embodiments, $\alpha$ is about 15° and $\beta$ is about 120° to about 160°. In further embodiments, $\alpha$ is about 30° and $\beta$ is about 130° to about 155°. In yet further embodiments, $\alpha$ is about 45° and $\beta$ is about 20° to about 45° or about 145° to about 155°. In still further embodiments, $\alpha$ is about 60° and $\beta$ is about 30° to about 60°. In certain embodiments, $\alpha$ is about 75° and $\beta$ is about 45° to about 55°.

In certain embodiments, $\alpha$ is about 15° and $\beta$ is about 5° to about 15° or about 120° to about 175°. In further embodiments, $\alpha$ is about 30° and $\beta$ is about 10° to about 30° or about 125° to about 170°. In yet further embodiments, $\alpha$ is about 45° and $\beta$ is about 15° to about 45° or about 145° to about 155°. In still further embodiments, $\alpha$ is about 60° and $\beta$ is about 15° to about 60° or about 150° to about 160°. In certain embodiments, $\alpha$ is about 75° and $\beta$ is about 10° to about 60° or about 160° to about 165°.

In certain embodiments, $\alpha$ is about 15° and $\beta$ is about 5° to about 15° or about 110° to about 180°. In further embodiments, $\alpha$ is about 30° and $\beta$ is about 10° to about 30° or about 120° to about 175°. In yet further embodiments, $\alpha$ is about 45° and $\beta$ is about 10° to about 45° or about 140° to about 165°. In still further embodiments, $\alpha$ is about 60° and $\beta$ is about 15° to about 60° or about 155° to about 165°. In certain embodiments, $\alpha$ is about 75° and $\beta$ is about 5° to about 60° or about 160° to about 165°.

In certain embodiments, the composite material exhibits complete auxeticity. In further embodiments, the composite materials exhibit auxeticity in the x-, y-, and z-directions.

In certain embodiments, the stiffness ratio is about 1000.

In certain embodiments, $\alpha$ is about 15° and $\beta$ is about 5° to about 10° or about 135° to about 170°. In further embodiments, $\alpha$ is about 30° and $\beta$ is about 10° to about 25° or about 125° to about 165°. In yet further embodiments, $\alpha$ is about 45° and $\beta$ is about 15° to about 45° or about 140° to about 165°. In still further embodiments, $\alpha$ is about 60° and $\beta$ is about 25° to about 40°. In certain embodiments, $\alpha$ is about 75° and $\beta$ is about 15° to about 30° or about 35° to about 40°.

In certain embodiments, $\alpha$ is about 0° to about 75° and $\beta$ is about 0° to about 65° or about 155° to about 180°.

In further aspects, the present invention provides aerospace structural components comprising the composite materials described herein.

In yet further aspects, the present invention provides a plate or shell comprising the composite materials described herein.

In still further aspects, the present invention provides architectural materials comprising the composite materials described herein.

In still further aspects, the present invention provides vehicle comprising the composite materials described herein.

In still further aspects, the present invention provides domes comprising the composite materials described herein.

In certain aspects, the present invention provides sports or body armor materials comprising the composite materials described herein.

In still further aspects, the present invention provides wearable materials, such as clothing, shoes, gloves, and masks, comprising composite materials described herein.

In certain aspects, the present invention provides methods of preparing the composite materials described herein, wherein the material is prepared by 3D printing. In certain embodiments, the composite material is not prepared by 3D printing.

Material Design

In certain embodiments, the two-dimensional periodic chevron mechanical metamaterial was composed of two levels of stiff layers and soft matrix. The representative volume element (RVE) of it is shown in FIG. 1a (left). The x and y dimensions of the RVE are W and h, respectively. The stiff layers are represented by the dark area in FIG. 1a, and the soft matrix is represented by the light area in FIG. 1a. The RVE is symmetric about y axis. To quantify the in-plane anisotropic mechanical properties of the design, in-plane tensile loads were applied in an arbitrary direction forming an angle $\theta$ with the x axis. Due to symmetry, $\theta$ vary from 0° to 90°. When $\theta$ is equal to 0° the loading direction is along the x-direction, the v-shaped stiff layers at level 1 form angle $\alpha$ with 3 y axis. The y-thickness of these stiff layers are t2, and the y-distance between the boundary of two neighboring stiff layers is t1. In the space between the stiff layers, stiff layers at level 2 are embedded in the soft matrix. The layers at level 2 form angle $\beta$ (FIG. 1a) with the layers at level 1. By varying $\alpha$ and $\beta$ values, a family of periodic chevon mechanical metamaterials can be obtained. The value of $\beta$ can vary between 0° and 180°.

In certain exemplary embodiments, the volume fraction f1 of the layers at level 1 is 0.19, and the volume fraction f2 of the layers at level 2 is 0.43. The geometry parameters are summarized in Table. 1.

TABLE 1

The geometry parameters for the structure.

| | parameters | | | |
|---|---|---|---|---|
| | W (mm) | h (mm) | $t_1$ (mm) | $t_2$ (mm) | $f_2 = \dfrac{2t_2}{h}$ |
| values | 19 | 12.4 | 5.05 | 1.15 | 0.19 |

Definitions

As used herein, "Poisson's ratio" refers to the ratio of transverse contraction strain to longitudinal extension strain in a stretched material. A material is said to have a positive Poisson's ratio is when said material becomes thinner when stretched. A material is said to have a negative Poisson's ratio is when said material gets thicker when stretched.

As used herein the term "auxetic" refers to a material or structure possessing a negative Poisson's ratio. In other words, when stretched, auxetic materials become thicker (as opposed to thinner) or expand in a direction perpendicular to the applied force. This occurs due to inherent hinge-like structures within the materials which flex when stretched. In contrast, materials with a positive Poisson's ratio contract in a direction perpendicular to the applied force. It will be recognized that whether a structure has a negative Poisson's ratio, may depend upon the degree to which the structure is stretched. Structures may have a negative Poisson's ratio up to a certain stretch threshold, but when stretched past the threshold may have a positive Poisson's ratio. Preferably, the structure or material possesses a negative Poisson's ratio during the entirety of the stretch.

As used herein, the term "complete auxeticity" refers to materials possessing a negative Poisson's ratio when an applied force is applied in all different directions.

As used herein, the term "metamaterial" refers to an assembly of multiple individual elements. These elements are fashioned from conventional materials such as metals or plastics, but the materials are usually arranged in specific periodic patterns. Therefore, metamaterials gain their properties not only from their composition, but also from their structures. Metamaterials have properties that are not found in the bulk materials, which can include electromagnetic radiation, sound waves, electrical properties and mechanical properties. Mechanical metamaterials are metamaterials which have mechanical properties that can be designed to have properties not found in nature.

As used herein, the term "stratified material" refers to a layered material.

As used herein, the term "volume fraction" refers to the percentage of the total volume of a material corresponding to pores or voids in the material. This term is akin to the "void volume" of a material, which is typically expressed as a percentage.

As used herein, the term "wearable material" refers to items that are worn on a subject's body, thought of both in a traditional sense as articles of clothing (e.g., shirts, pants, vests, dresses, underwear, vests, suits, jackets, skirts, etc.), as well as articles/objects that may not be traditionally thought of as articles of clothing but that may nevertheless be worn on a subject's body such as shoes, hats, athletic equipment (e.g., pads, guards, helmets, masks, and the like), respirator masks, diapers, mouth guards, armor, or other type of wearable objects described herein. Indeed, the terms article, object and garment are meant to include any article of manufacture that a subject (e.g., human, animal (e.g., dog, horse, cat, etc.) may wear or be made to wear. Utilizing the methods of the present invention, a customized, wearable object may be generated and worn by a subject once and discarded, or, may be worn multiple (e.g. 2-10, 10-20, 20-30, 30-40, 40-50, 50-60, 60-70, 70-80, 80-90, 90-100, or more) times before the subject no longer finds use for the wearable object (e.g., the object is thrown out, recycled, or provided to another subject to wear).

As used herein, "stiffness" of a material is the ratio of change in compressive load (e.g., force in Newtons) to displacement of the material (e.g., displacement in millimeters along the axis of the compressive load).

As used herein, the terms "optional" or "optionally" mean that the subsequently described event or circumstance may occur or may not occur, and that the description includes instances where the event or circumstance occurs as well as instances in which it does not.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In order to develop the auxetic materials of the present disclosure, finite element models of the new chevron composites were developed. To identify the design space with auxeticity, numerous finite element simulations were conducted in ABAQUS via Python script by modeling the fibrous layer as an equivalent anisotropic continuum. Different design parameters of the designed materials were extensively explored to achieve auxetic effects. After determining the design space, the Representative Volume Elements (RVEs) with the detailed structure of selected designs were developed. Finite element simulations with Periodic Boundary Conditions (PBCs) were performed to obtain the effective mechanical properties of the identified designs. The key factors, which mainly affect the auxetic effects of the designs, were analyzed.

Then, the selected designs are fabricated via a multi-material 3D printer (Stratasys Connex 3). Uni-axial tension experiments were performed to obtain the effective stiffness and Poisson's ratio of the designs. Experiment results were compared with numerical results to prove the concept. Based on the numerical and experiment results, the mechanism of auxetic effects was analyzed, and design guidelines for the new auxetic chevron composite were provided. Finally, the complete auxeticity of the metamaterial was investigated. Completely auxeticity of the metamaterial was theoretically analyzed based on numerical results. Numerical simulations under different loading directions were conducted to verify the theoretical results. The numerical results indicate the design spaces where the metamaterial shows a complete auxeticity effect.

EXAMPLES

Example 1: Mechanical Experiments

Specimen Design and Fabrication

Figure 1C:
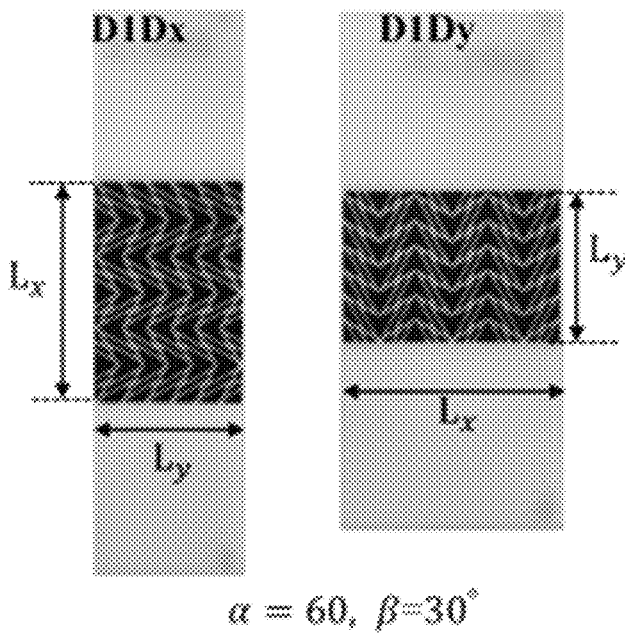
FIG. 1C shows the 3D printed specimens of design 1.
Figure 1D:
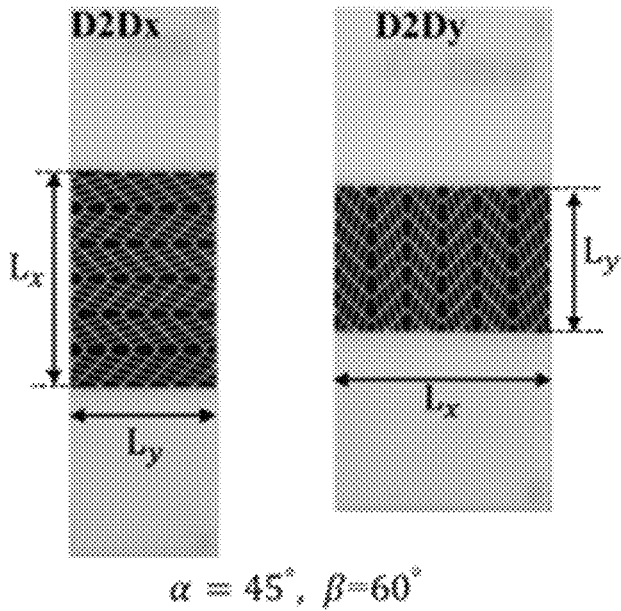
FIG. 1D shows the 3D printed specimens of design 2.

Chevron mechanical metamaterials with different alpha and beta values were designed: Design 1 was with alpha=60°, beta=30°; Design 2 was with alpha=45°, and beta=60°. The in-plane thickness of the layers at level 1 was 1.15 mm, and the in-plane thickness at level 2 was 1.15 mm, in order to characterize the overall effective stiffness and the effective Poisson's ratio in both x-direction and y-direction. As shown in FIGS. 1c and 1d, four specimens were designed and fabricated via a multi-material 3D printer (Stratasys Objet connex 3). For each specimen, the designed area included 3×3 RVEs. The designed area was the size of L1×L2=57×37.2 mm. The out-of-plane thickness for all specimens is 2 mm. Thus, the volume fraction of the hard phase for design 1 was 0.44, and that for design 2 was 0.44. The hard phase was printed as VeroWhite, which is a white acrylic polymer with Young's modulus=1000 MPa, and the soft phase material was printed Aglis, which is a black rubbery material with Young's modulus=0.79 MPa.

Experimental and Numerical Results

The specimens were mounted on an Instron Material testing machine. Uni-axial tension tests were performed under displacement control condition. The deformation configurations from experiments and FE simulations are compared in FIGS. 2a and 2b.

Figure 2A:
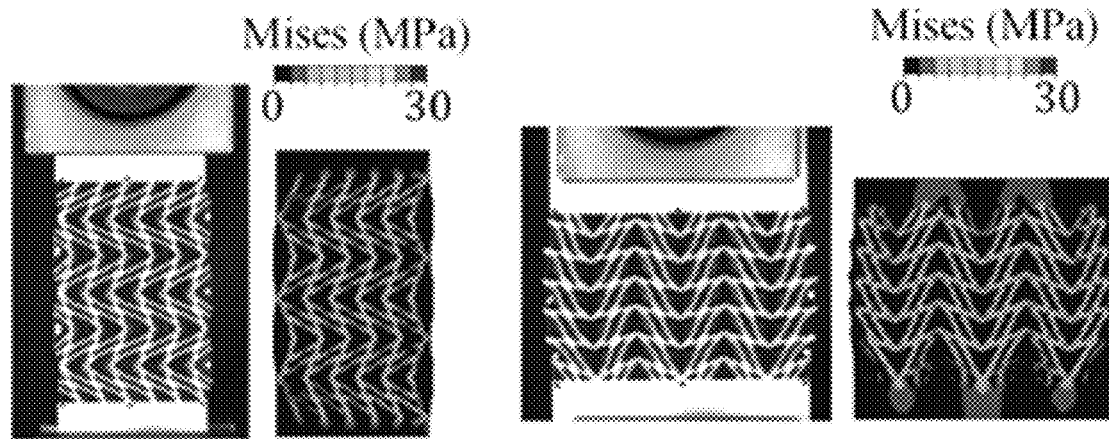
FIG. 2A shows the deformed configurations from experiments and FE (Finite Element) simulations of design 1 at overall strain in the designed area of 3%.
Figure 2B:
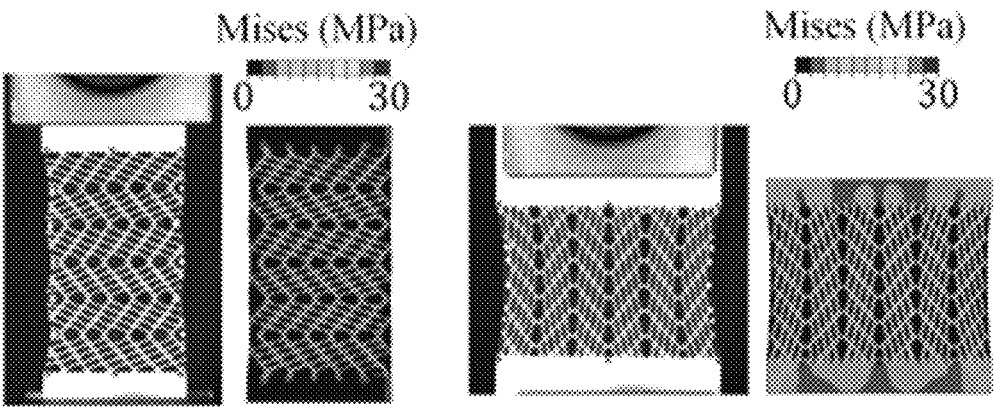
FIG. 2B shows the deformed configurations from experiments and FE (Finite Element) simulations of design 2, at overall strain in the designed area of 3%.

Interestingly, as shown in FIGS. 2a and 2b, design 1 shows a negative Poisson's ratio effects in both directions: expand in the lateral direction, when loaded vertically. While for design 2, a positive Poisson's ratio effect is observed when loaded in both directions, i.e., shrinking in the lateral direction under a vertical loading. Since the only difference between the two designs are the values of beta and alpha, the results indicate that $\beta$ and $\alpha$ are the key parameters to control the overall mechanical properties and behaviors of this family of chevron mechanical metamaterial.

Figure 2C:
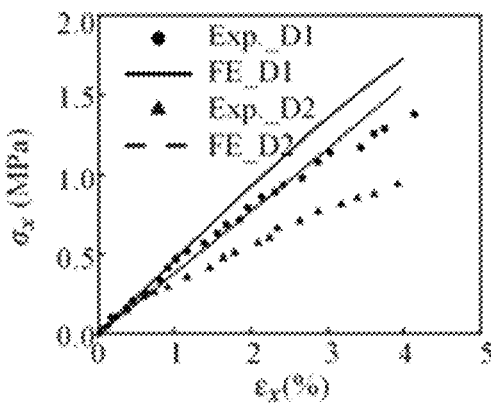
FIG. 2C shows the comparison of FE (Finite Element) simulations and experimental results in the x-direction.
Figure 2C:
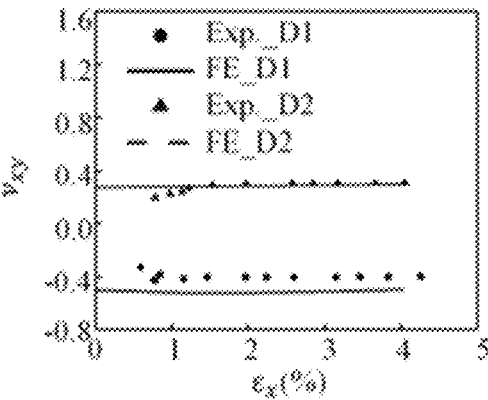
Figure 2D:
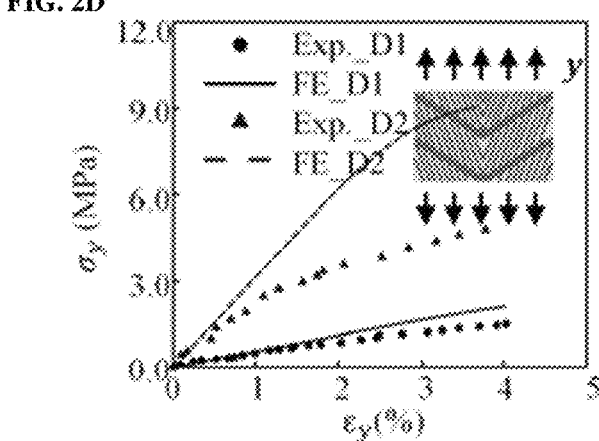
FIG. 2D shows the comparison of FE (Finite Element) simulations and experimental results in the y-direction.
Figure 2D:
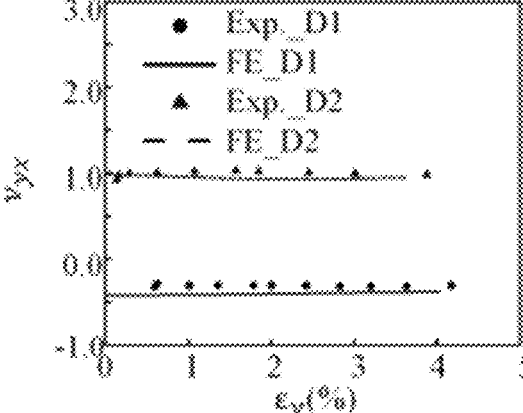

The stress-strain curves and the Poisson's ratio from experiments and FE simulations are compared in FIGS. 2c and 2d. In general, the initial slopes of the stress-strain curves from experiments and FE simulations match very well with each other, while when strain increases, the FE simulation curves become higher than those from experiments. This is because of the development of microcracks and damages in the specimens, which are not modeled in the FE simulations. Under small deformation (<5%), the effective Poisson's ratio is a constant for all four specimens. For design 1, the Poisson's ratio is negative in both directions: −0.4 for vxy and −0.33 for vyx.

Example 2: Systematic Finite Element Analysis

FE (Finite Element) Simulations

Two-dimensional FE models of the four specimens were developed, plane stress, 4-nodes quadratic elements were used, and the average mesh size is 0.1 mm. Total 74,000 elements are in each model. The hard phase was modeled as an elastoplastic material following a power-law hardening rule. The soft phase was modeled via Ogden hyperelastic material. The model parameters were obtained from the dogbone tests of each component material.

FE Models

To quantify the anisotropic mechanical properties of this family of chevron mechanical metamaterials, a series of 2D FE models were developed in ABAQUS/CAE 2018 by varying alpha=15°-75°, and beta=0°-180°. 2D plane stress 4-node quadratic elements were used. To simulate the uni-axial tension loading condition, prescribed displacements can be applied in an arbitrary direction θ in the x-y plane. Periodic boundary conditions (PBCs) were applied to the four edges of the RVE in the FE model.

Both the stiff and soft phases are homogenous, isotropic, and linearly elastic. For the soft phase, the Young's modulus $E_m$ is 1 MPa, and the Poisson's ratio vm is 0.46. For the stiff phase, the Young's modulus $E_f$ varies as 10 MPa, 100 MPa, 1 GPa, and 10 GPa, and the Poisson's ratio vf is fixed as 0.3. Thus, the stiffness ratio between the stiff and soft phase varies as 10, 102, 103, 104, respectively. The fibrous layers between the layers at level 1 were modeled as transversely isotropic material. The effective stiffness matrix was calculated based on the rule of mixtures and the defining of transversely isotropic elastic.

Effective Stiffness

Figure 3A:
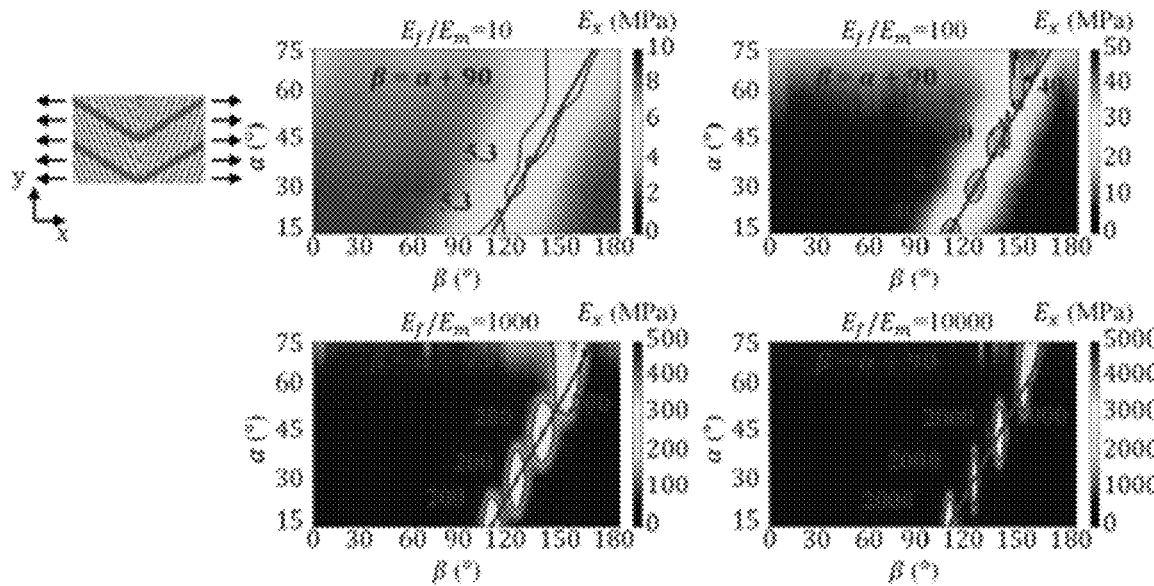
FIG. 3A shows the effective stiffness of metamaterial when loading in the x-direction.
Figure 4A:
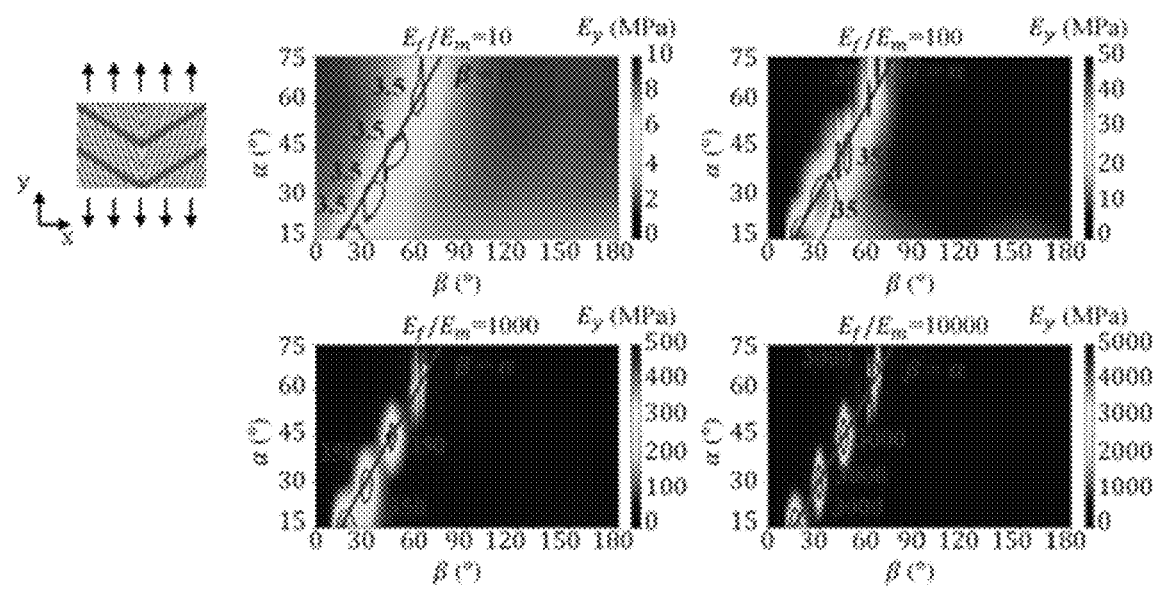
FIG. 4A shows the effective stiffness of metamaterial when loading in the y-direction

In this section, the influence of fiber orientation $\beta$, material properties, and tooth tip angle $2\alpha$ on the effective stiffness Ex, Ey of the metamaterial with fibrous layer was analyzed. The stiffness contour is shown in FIGS. 3a and 4a.

The stiffness ratio has a significant influence on effective stiffness. A large stiffness ratio leads to significant effective stiffness. The distribution of effective stiffness for different stiffness ratios has the same shape. The maximum effective stiffness concentrates on specific regions. In other areas, the difference in effective stiffness is slight. It indicates that effective stiffness is very sensitive to orientation β and tooth tip angle 2α.

The fiber orientation β and tooth tip angle 2α has a combined effect on the effective stiffness. When β=α, i.e. when the layers at level 2 are along the y direction, the effective stiffness Ey has a peak value; while for β=α+90°, i.e. when the layers at level 2 are along the x direction, the effective stiffness Ex has a peak value.

Auxeticity in x and y Directions

In order to identify the design space for auxeticity, FE models of a family of designs with different α and β values were developed. The effective Poisson's ratios in the x and y directions of this family of designs were systematically evaluated via FE simulations. By applying the prescribed overall uni-axial strain 1% in the x direction, the effective Poisson's ratio vxy can be obtained for each combination of α and β with different stiffness ratios. The results are shown in FIGS. 3b and 4b.

Figure 3B:
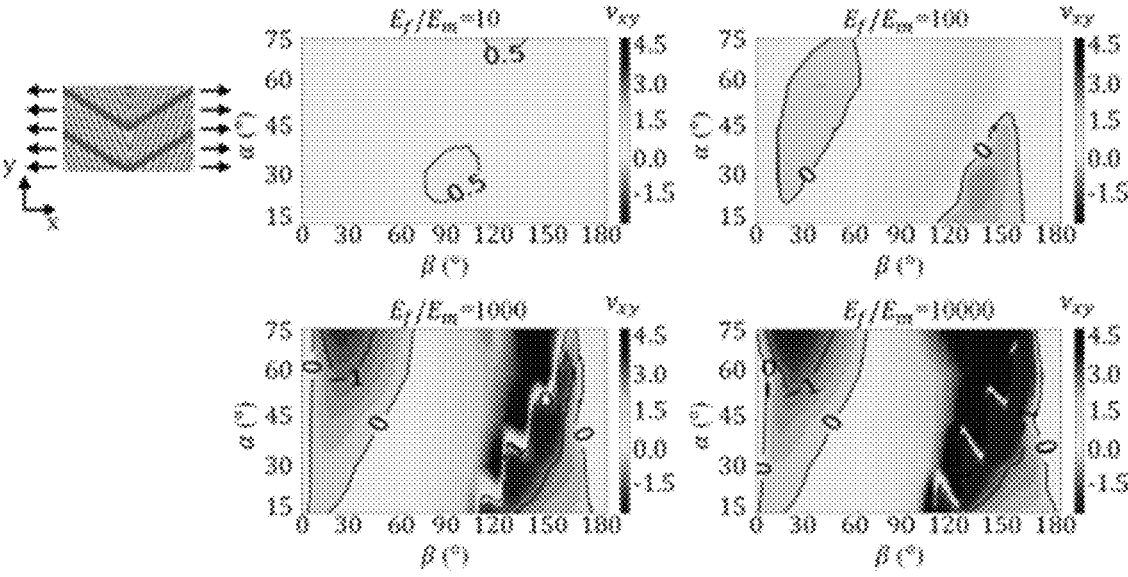
FIG. 3B shows the effective Poisson's ratios vxy in x-direction in the design space ($\alpha$, $\beta$, Ef/Em).
Figure 4B:
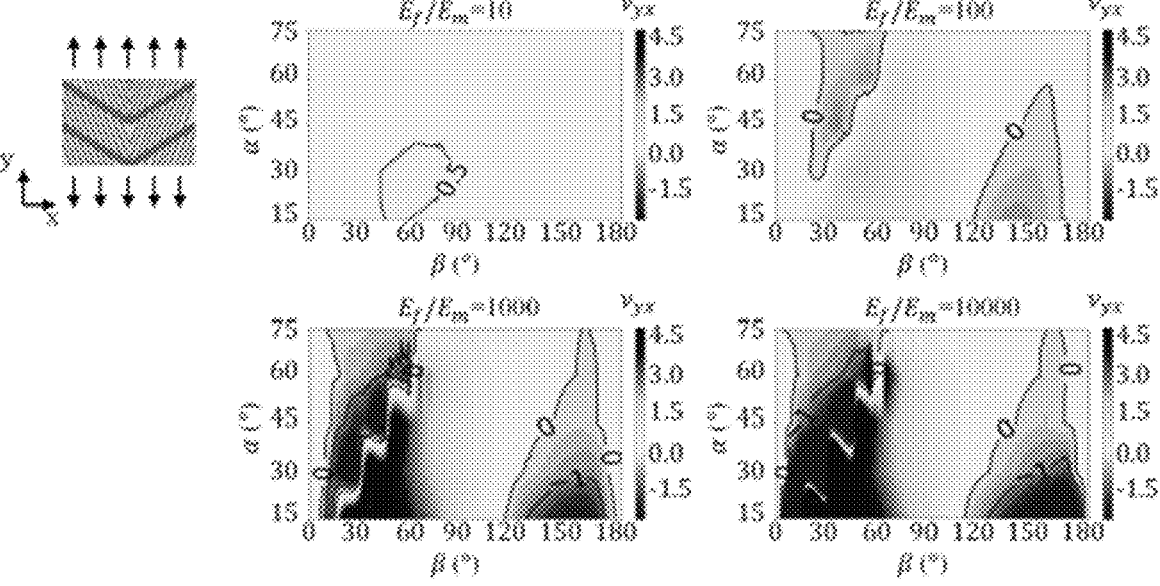
FIG. 4B shows the effective Poisson's ratios vyx in the y direction in the design space ($\alpha$, $\beta$, Ef/Em).

FIG. 3b shows that the material shows auxeticity when loaded in the x direction in some design space but not all design space. Generally, when the stiffness ratio increases, the absolute value of the effective Poisson's ratio vxy increases, and therefore, the design space for auxeticity increases. When the stiffness ratio equals to 10, the material is not auxetic in the x direction for any combination of α, and β explored. The auxeticity is due to the shear-induced dilation of the fibrous layers between the layers at level 1. When the fibrous layers are subjected to shear at the boundaries, the stiff layers at level2 will rotate. The layer will either shrink or dilate depending on the direction of rotation, which leads to either a positive or negative Poisson's ratio.

Similarly, by applying the prescribed overall uni-axial strain 1% in the y direction, the effective Poisson's ratio vyx was obtained for each combination of α and β with different stiffness ratios. The results are shown in FIG. 4b. Again, in some design spaces, the materials show auxeticity when loaded in the y direction. When the stiffness ratio equals to 10, the material is not auxetic in the y direction for any combination of α and β explored. When the stiffness ratio increases, the absolute value of the effective Poisson's ratio vyx increases, and therefore the design space for auxeticity increases.

Interestingly, when loaded in x or y directions, for certain combinations of α and β, the effective Poisson ratio can suddenly change from a very positive value to a very negative value, indicating a high sensitivity to a small change in α and β; while for other combinations of α and β, the change is graceful. This critical β value for this type of dramatic change is larger than 900 when loading in the x-direction and less than 90° when loading in the y-direction. β=α+90° is the boundary between very negative and positive value when loaded in x direction, while β=α is the boundary when loaded in y direction.

Bi-Auxeticity

Figure 5:
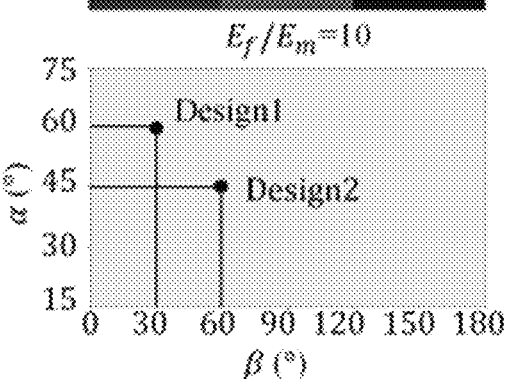
FIG. 5 shows the design spaces with bi-auxeticity.
Figure 5:
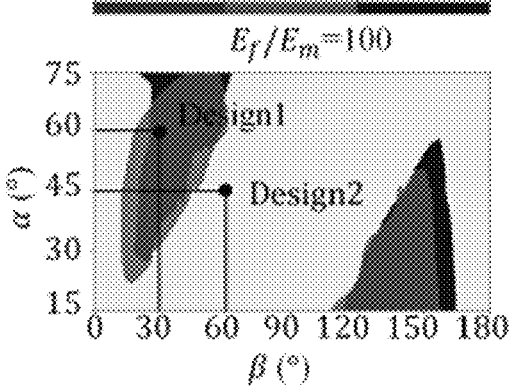
Figure 5:
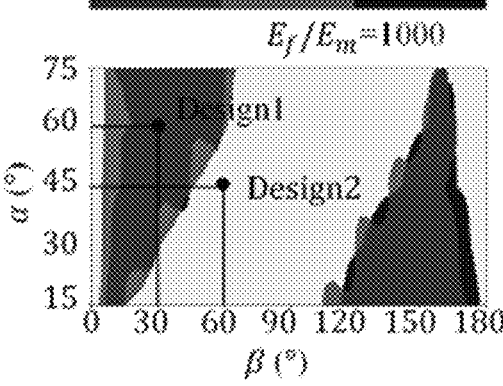
Figure 5:
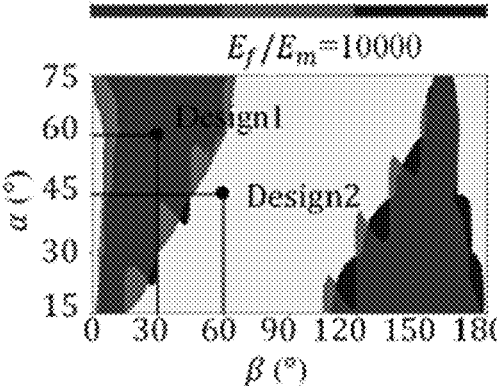

If a material shows auxeticity when loaded in both x-direction and y-direction, it is referred to as bi-auxetic. Based on the results in FIGS. 3b and 4b, the design space with bi-auxeticity is identified as the red area in FIG. 5. When the stiffness ratio equals 10, the material is not auxetic when loaded in either x or y directions. Therefore, there is no design space with bi-auxeticity. When the stiffness ratio increases, two design domains (red domains in FIG. 5) with bi-auxeticity show up, and the size of each domain increases with the stiffness ratio.

Complete Auxeticity

In a linear elastic solid, Poisson's ratio v(n, m) is the ratio of lateral contraction in the m direction to axial extension in the n direction. n(n₁, n₂, n₃) and m(m₁, m₂, m₃) are orthogonal unit vectors representing the axial and lateral directions, respectively. For an anisotropic material, v(n, m) varies depending on the chosen n and m directions. If Poisson's Ratio v(n, m)<0 for all pairs (n, m), the material is termed a completely auxetic medium. Conversely, if Poisson's ratio v(n, m)≥0 for all pairs of (n, m), the material is referred to as a non-completely auxetic medium.

The metamaterial's auxetic behavior is examined under various loading directions θ using ABAQUS to determine its complete auxeticity, referred to as θ-auxeticity. Based on the theory of completely auxetic linear elastic mediums, Eq. (1) of coefficient s'₁₂ is formulated to assess whether the metamaterial discussed herein is completely auxetic.

$$s'_{12} = \left( \frac{1}{E_{11}} + \frac{1}{E_{22}} - 4\frac{1}{2G_{12}} \right) \sin\theta^2 \cos\theta^2 - \frac{v_{21}}{E_{22}} (\sin\theta^4 + \cos\theta^4) \tag{1}$$

where $E_{11}$ represents the effective stiffness of the metamaterial in the x-direction, while $E_{22}$ denotes the effective stiffness in the y-direction. $v_{21}$ refers to the effective Poisson's ratio of the metamaterial under loading in the y-direction, and $G_{12}$ is the effective shear modulus in the x-direction.

The coefficient s'₁₂ plays a crucial role in categorizing the material as completely auxetic, partially auxetic, or non-auxetic. To be considered completely auxetic, s'₁₂ must consistently be positive for any loading direction θ. Conversely, if s'₁₂ is negative or zero for any θ, the material is deemed non-auxetic. When s'₁₂ is negative or zero for certain θ values and positive for others, the material exhibits partial auxeticity.

Figure 6:
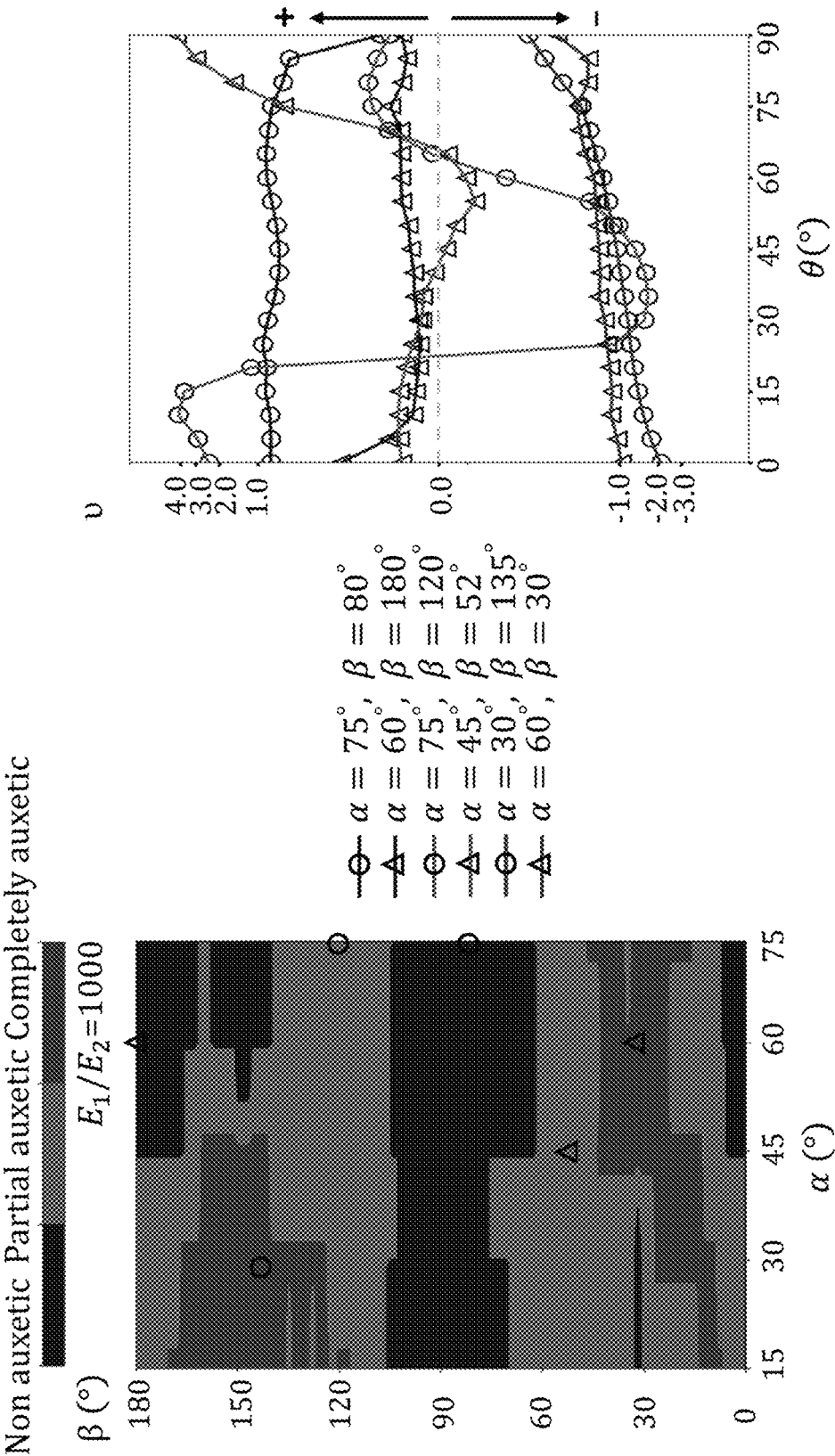
FIG. 6 shows the design space of completely and non-completely auxetic material.

Numerical simulations, featuring a stiffness ratio of 1000, are systematically conducted to ascertain material parameters such as $E_{11}$, $E_{22}$, $v_{21}$, $v_{12}$ and $G_{12}$, via varying the fiber orientation (β) and tooth tip angle (2α). In the case of a completely auxetic metamaterial, where $v_{21}$ is inherently negative, the analysis primarily concentrates on determining the coefficient of the first term in equation (1) is positive. Conversely, for the non-auxetic material, where $v_{21}$ is inherently positive, the analysis aims to establish that the coefficient of the first term in equation (1) is negative. Cases that do not conform to these criteria are treated as instances of partial auxetic metamaterials. The coefficients s'₁₂ are calculated and analyzed, with the results presented in the left section of FIG. 6. In this figure, the red, green, and blue regions correspond to the design spaces for completely auxetic, partially auxetic, and non-auxetic metamaterials, respectively.

To confirm the theoretical analysis based on equation (1) and using data from numerical simulations with a stiffness ratio of 1000 under loading in both x and y directions, simulations under various loading directions θ are conducted to examine auxetic properties. The simulation cases are selected from the red, green, and blue areas depicted in FIG. 6, and are carried out using ABAQUS 2018. Owing to the symmetry of the model, θ is varied from 0° to 90°. The resulting Poisson's ratio curves for these scenarios are displayed in the right section of FIG. 6. Here, the red curves represent a completely negative Poisson's ratio across all loading directions θ, the green curves exhibit a negative or zero Poisson's ratio for certain directions and positive for others, and the blue curves consistently show a positive Poisson's ratio for each θ. These results affirm the conclusions from the left figure in FIG. 6 and provide the design space for chevron composites with complete auxeticity.

INCORPORATION BY REFERENCE

All U.S. and PCT patent application publications and U.S. patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

I claim:

1. A composite material, comprising:
a stratified material,
wherein the stratified material comprises:
(i) a first hard phase and a second hard phase, optionally wherein the first hard phase and the second hard phase are not parallel;
wherein each of the first hard phase and the second hard phase comprises a fiber material with an effective stiffness ($E_f$); and
(ii) a soft phase, wherein the soft phase comprises a matrix material with an effective stiffness ($E_m$);
wherein the ratio of $E_f$ to $E_m$ ($E_f/E_m$) is a stiffness ratio greater than about 10;
in a representative volume element of the composite material, the angle of the first hard phase with respect to a central y-axis of the representative volume element is represented by $\alpha$;
the angle of first hard phase with respect to the second hard phase is represented by $\beta$;
$\alpha$ is about 0° to about 75°; and
$\beta$ is about 0° to about 65° or about 110° to about 180°.

2. The composite material of claim 1, wherein the composite material exhibits auxetic behavior.

3. The composite material of claim 1, wherein the volume fraction of the composite material is less than about 10%.

4. The composite material of claim 1, wherein the composite material has no pores or voids.

5. The composite material of claim 1, wherein the fiber material is selected from carbon fibers, glass fibers, aramid fibers, natural fibers, basalt fibers, polymer fibers, and metallic fibers.

6. The composite material of claim 1, wherein the matrix material is selected from polymer matrix, metal matrix, ceramic matrix, carbon matrix, and hybrid polymer/ceramic matrix.

7. The composite material of claim 1, wherein the composite material is patterned.

8. The composite material of claim 1, wherein the stiffness ratio is greater than 10.

9. The composite material of claim 1, wherein the stiffness ratio is about 100.

10. The composite material of claim 1, wherein the stiffness ratio is about 1000.

11. The composite material of claim 1, wherein the stiffness ratio is about 10000.

12. The composite material of claim 9, wherein $\alpha$ is about 45° and $\beta$ is about 20° to about 45° or about 145° to about 155°.

13. The composite material of claim 10, wherein $\alpha$ is about 45° and $\beta$ is about 15° to about 45° or about 145° to about 155°.

14. The composite material of claim 11, wherein $\alpha$ is about 45° and $\beta$ is about 10° to about 45° or about 140° to about 165°.

15. The composite material of claim 1, wherein the composite material exhibits auxeticity.

16. The composite material of claim 15, wherein $\alpha$ is about 45° and $\beta$ is about 15° to about 45° or about 140° to about 165°.

17. An aerospace structural component, comprising a composite material of claim 1.

18. A sports or body armor material or a wearable material, comprising a composite material of claim 1.

19. The composite material of claim 9, wherein $\alpha$ is about 60° and $\beta$ is about 30° to about 60°.

20. The composite material of claim 10, wherein $\alpha$ is about 60° and $\beta$ is about 15° to about 60° or about 150° to about 160°.

21. The composite material of claim 11, wherein $\alpha$ is about 60° and $\beta$ is about 15° to about 60° or about 155° to about 165°.

22. The composite material of claim 10, wherein $\alpha$ is about 60° and $\beta$ is about 25° to about 40°.

23. The composite material of claim 7, wherein the composite material is patterned with a chevron pattern.

24. The composite material of claim 1, wherein $\beta$ is about 0° to about 65°.

25. The composite material of claim 1, wherein $\beta$ is about 110° to about 180°.

\* \* \* \* \*